R. DUTTON.
Harvester-Cutters.
No. 157,588. Patented Dec. 8, 1874.
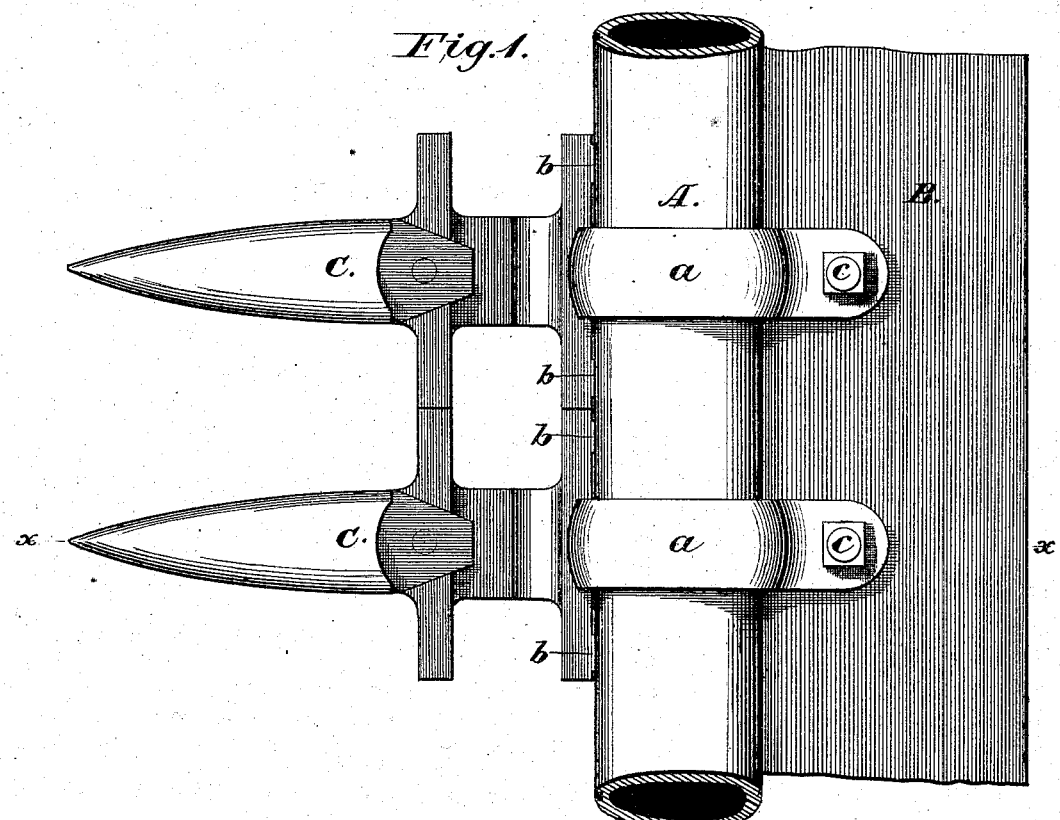
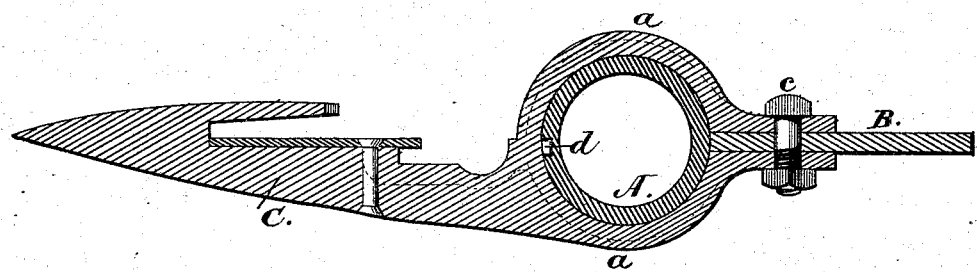
Witnesses:
Henry P. Sisson,
Asa Hurd.
Inventor.
Rufus Dutton.

UNITED STATES PATENT OFFICE.

RUFUS DUTTON, OF YONKERS, NEW YORK.

IMPROVEMENT IN HARVESTER-CUTTERS.

Specification forming part of Letters Patent No. 157,588, dated December 8, 1874; application filed March 9, 1874.

*To all whom it may concern:*

Be it known that I, RUFUS DUTTON, of the city of Yonkers, in the county of Westchester and State of New York, have invented a new and useful Improvement in Fingers and Finger-Bars for Harvesting-Machines, of which the following is a specification:

The object of my invention is to make a new and improved finger-bar especially adapted for grain-reaping machines; and consists of a tubular bar, a back rest or brace, with the fingers so constructed that when bolted to the back-rest or brace both the bar and fingers will be held firmly in position.

The improvement herein claimed will best be shown by reference to the accompanying drawings and figures of reference marked thereon, and making a part of this specification.

Figure 1 is a plan view, showing a section of the finger-bar. Fig. 2 is a vertical section of the same.

Fig. 1, A is a portion of the tubular finger-bar. B is what I term a back-rest or brace, and may be made either of wood or metal, as best suited to the machine on which the bar is to be used; C, the fingers. On the front side of the tubular bar I form a groove, $d$, Fig. 2, and suited to which I make projections $b\ b\ b\ b$ on the flanges of the fingers, Fig. 1. These projections, when placed in the groove $d$, hold the fingers in line on the front side of the bar. The shanks $a\ a$ extend around the bar A and back onto the brace B, and are bolted firmly together by the bolt $c$. This bolt, together with the groove $d$ in front of the tubular bar, and the projections $b\ b\ b\ b$ on the fingers, hold the tubular bar and brace firmly together. By the use of the tube A I secure a stiff and light bar to support the platform and weight resting upon it between the driving and grain wheels of the machine, and by the brace B I support the bar against lateral strain.

By the shank of the fingers passing around the bar both the bar and fingers are held in proper position without the necessity of being fastened together by either bolts or rivets. A portion of the bar, being above the plane of the knife, serves as a trip for butts of the grain when it is being reeled upon the platform.

By this method I secure a light and strong finger-bar.

I claim—

The combination of the tubular finger-bar, the longitudinal groove therein, the finger embracing the tubular bar, the projection on the finger interlocking with the groove in the bar, and the back-rest or brace, to which the finger is secured at its rear end, these parts being constructed and operating substantially as set forth.

RUFUS DUTTON.

Witnesses:
WM. P. FITCH,
JAMES S. FITCH.